(No Model.)

J. W. MARSH.
Combined Wheelbarrow and Truck.

No. 241,148. Patented May 10, 1881.

WITNESSES
Frank Stone.
Geo. H. Coates

INVENTOR
John W. Marsh
By Chas. H. Burleigh
Atty.

UNITED STATES PATENT OFFICE.

JOHN W. MARSH, OF OXFORD, MASSACHUSETTS.

COMBINED WHEELBARROW AND TRUCK.

SPECIFICATION forming part of Letters Patent No. 241,148, dated May 10, 1881.

Application filed March 15, 1881. (No model.)

*To all whom it may concern:*

Be it known that I, JOHN W. MARSH, of Oxford, in the county of Worcester and State of Massachusetts, have invented certain new and useful Improvements in Wheelbarrows and Trucks; and I declare the following to be a description of my said invention sufficiently full, clear, and exact to enable others skilled in the art to which it appertains to make and use the same, reference being had to the accompanying drawings, which form a part of this specification.

The object of my invention is to provide a wheelbarrow conveniently and readily convertible for use either as a single-wheeled barrow or as a two-wheeled truck; also, to afford facilities for the adjustment of the running-gear more or less to the rearward, to vary the relative balance of the barrow or truck for different kinds of service.

One feature of my invention consists in making the wheel devices duplex, or in two parts, which are adapted for independent adjustment to central or side positions.

Another feature consists in so connecting the wheel-supporters of bearer-bars with the body by means of a sliding attachment and clamping devices as to permit forward or rearward adjustment of the wheels when in side position.

Other minor features embodied in the construction will be understood from the following detailed description and reference to the accompanying drawings, in which—

Figure 1:
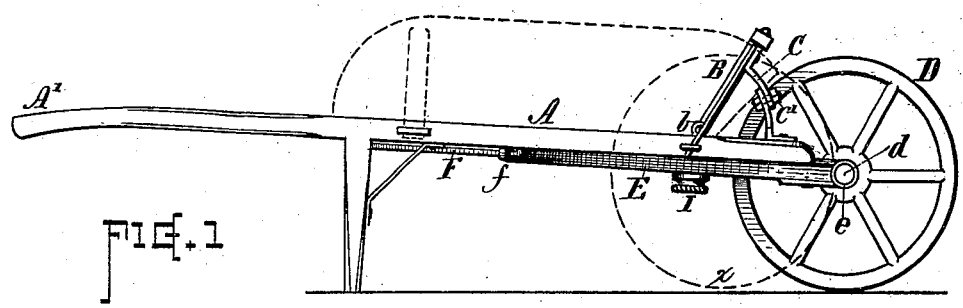
Figure 2:
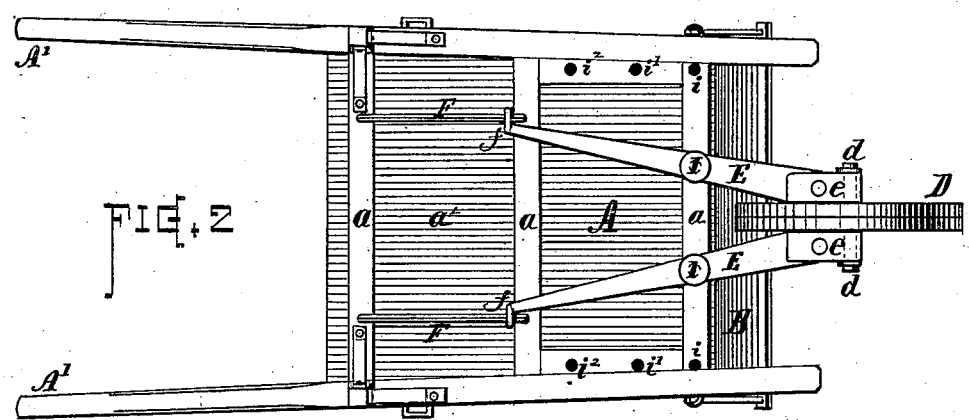
Figure 3:
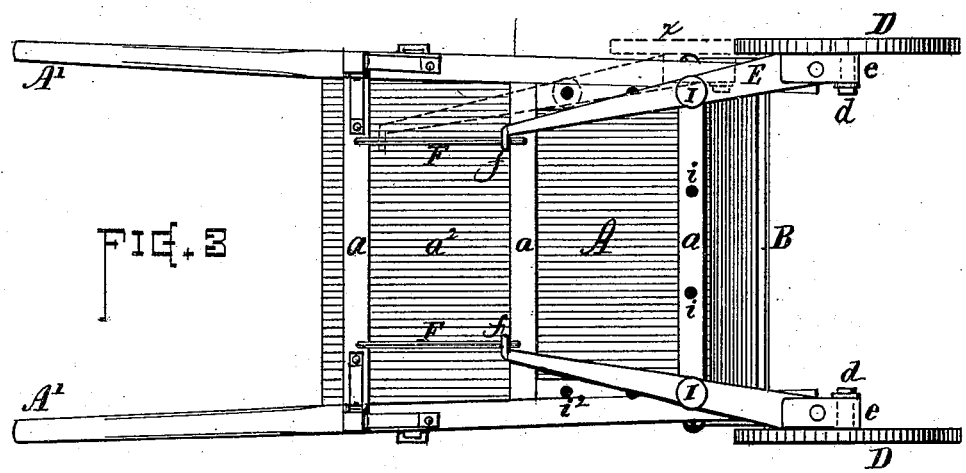

Figure 1 represents a side view of a convertible wheelbarrow illustrating my invention. Fig. 2 is a bottom view of the same, showing the wheel devices adjusted at central position; and Fig. 3 is a bottom view, showing the wheel devices adjusted at side positions.

The reference-letter A denotes the body of the barrow composed of the side frames with handles A', the transom-bars $a$, and the bottom board, $a^2$, as indicated.

B denotes the front board, which is hinged at its lower part, $b$, to the body A, and supported in upright or angular position by slotted segmental braces C, arranged at the front of the board, and held at adjusted positions by the clamp bolt and nut $c'$, as shown in Fig. 1. The inclination of the front board, B, can be varied by loosening the clamp $c'$ and readjusting as desired.

D indicates the duplex traveling wheel, constructed in two parts, or of two separate wheels, each of which is provided with a stud or journal, $d$, at one side only, its other side being made flush, so that the two wheels or parts can be brought close up to each other, side to side, to form or act as a single wheel, in the manner illustrated in Fig. 2.

E indicates detachable or adjustable bars, provided at their front ends with bearings $e$, for supporting and carrying the wheel-journals $d$, while at their rear ends, $f$, said bars are furnished with means for their attachment (adjustably or otherwise) to the body A of the barrow, and means are also provided for detachably connecting and retaining the central part of said bars E to the under side of the body-frame at the several desired positions of adjustment.

The relative construction and arrangement of the bearing-bars E and wheels D with the body A is such that, by reversing the position of said bars E, the wheels D may be supported at either a central position, as in Fig. 2, or at side positions, as in Fig. 3, accordingly as the bars E are turned with the wheel inward or outward. In the present instance the rear ends of the bearing-bars are connected to the body A by means of a ring or eye fixed to the bar at $f$, and running on a rod or guide, F, secured to the transom-bars $a$, so as to permit backward and forward movement while confining the end of the bar E against lateral movement. This construction may be modified, however, without departing from the nature of my invention—as, for instance, a slotted plate being used in lieu of the rod F, the end $f$ being confined within the slot; or, again, by slotting the bar E and connecting, by a stud, through such slot, or by other suitable connecting devices, whereby the end of the bar E will be properly retained in place.

The means herein shown for securing the center of the bar E to the body A, and retaining the parts in adjusted position, consists of a bolt or screw-stud, I, which is passed through the bar E and screws into suitable openings, $i$, at the various positions of adjustment. I do not, however, desire to confine myself to this particular mode of fastening, as other devices can be employed in lieu of the screw-stud I, and any device whereby the bars E would be detachably secured at their adjusted positions would serve as an equivalent fastening—as, for instance, by clasps or loops passing over said bars E, turn-buttons, key-and-eye pins, or spring-catches—for locking the bars in place and permitting convenient detachment.

The wheels D can be set more or less toward the rear to change the relative balance of the barrow by placing the clamp-stud I of fastening device in one of the holes $i'$ or $i^2$. (See dotted line $x$, Figs. 1 and 3.) The rear end, $f$, of the bar E moves back along the guide F to permit such adjustment. This arrangement of the wheels, together with the movable front board, C, permits convenient dumping of loads to the front when desired.

By adjusting one part of the running-gear at side position and the other part at central position the barrow can be conveniently handled by a person having but one arm.

I am aware that the front boards of wheelbarrows have heretofore been made to adjust to different angles, and I do not, therefore, here make claim, broadly, to such feature.

What I claim as of my invention, and desire to secure by Letters Patent, is—

1. A convertible wheelbarrow provided with duplex-wheel devices adapted for separate adjustment to side or central positions, whereby said vehicle can be arranged for use as a single-wheeled barrow or two-wheeled truck, as set forth.

2. The combination, with the body or frame of a wheelbarrow, of two wheel-supporting bars or bearing-pieces having traveling wheels journaled on their forward ends and detachably connected to said frame, said bars being arranged for reverse adjustment, or to support the wheels at central or side positions, for the purposes set forth.

3. The combination, substantially as hereinbefore described, of the body or frame, the bearing-bars having their inner ends adjustably connected with said frame, the wheels journaled on the forward ends of said bearing-bars, and the screw-studs or fastening devices for retaining the parts in adjusted position, for the purposes set forth.

4. The combination, substantially as described, of the frame or body, the wheels with bearing-bars, and the guide-pieces attached to the under part of said body for retaining the rear ends of said wheel-bearing bars, and permitting forward and rearward adjustment of the same, as set forth.

5. The combination, substantially as described, of the body or frame, the adjustable double-wheel devices arranged for forward and rearward adjustment, and the movable front board provided with the slotted segmental braces and clamping-bolts, as and for the purposes set forth.

Witness my hand this 12th day of March, A. D. 1881.

JOHN W. MARSH.

Witnesses:
CHAS. H. BURLEIGH,
S. E. KING.